（12）United States Patent
Reed et al.

(10) Patent No.: US 7,397,799 B2
(45) Date of Patent: Jul. 8, 2008

(54) HIGHLY PARALLEL SWITCHING SYSTEMS UTILIZING ERROR CORRECTION

(75) Inventors: Coke S. Reed, Cranbury, NJ (US); David Murphy, Austin, TX (US)

(73) Assignee: Interactic Holdings, LLC, New York, NY (US)

( * ) Notice: Subject to any disclaimer, the term of this patent is extended or adjusted under 35 U.S.C. 154(b) by 611 days.

(21) Appl. No.: 10/976,132

(22) Filed: Oct. 27, 2004

(65) Prior Publication Data
US 2005/0105515 A1    May 19, 2005

Related U.S. Application Data

(60) Provisional application No. 60/515,937, filed on Oct. 29, 2003.

(51) Int. Cl.
*H04L 12/28* (2006.01)
*H04J 3/24* (2006.01)
*H04J 3/00* (2006.01)

(52) U.S. Cl. .................. 370/392; 370/474; 370/476

(58) Field of Classification Search ................ None
See application file for complete search history.

(56) References Cited

U.S. PATENT DOCUMENTS

| 5,996,020 | A  | * | 11/1999 | Reed ........................ 709/238 |
| 7,088,710 | B1 | * | 8/2006  | Johnson et al. ........... 370/357 |
| 2003/0193943 | A1 | * | 10/2003 | Reed et al. ................ 370/389 |
| 2004/0264369 | A1 | * | 12/2004 | Reed et al. ................ 370/229 |
| 2005/0105515 | A1 | * | 5/2005  | Reed et al. ................ 370/360 |
| 2005/0238032 | A1 | * | 10/2005 | Hesse ....................... 370/401 |
| 2006/0029058 | A1 | * | 2/2006  | Reed et al. ................ 370/388 |
| 2006/0171386 | A1 | * | 8/2006  | Hesse et al. ............... 370/389 |

* cited by examiner

*Primary Examiner*—Andrew C. Lee
(74) *Attorney, Agent, or Firm*—Koestner Bertani LLP; Ken J. Koestner

(57) ABSTRACT

An interconnect structure comprises a logic capable of error detection and/or error correction. A logic formats a data stream into a plurality of fixed-size segments. The individual segments include a header containing at least a set presence bit and a target address, a payload containing at least segment data and a copy of the target address, and a parity bit designating parity of the payload, the logic arranging the segment plurality into a multiple-dimensional matrix. A logic analyzes segment data in a plurality of dimensions following passage of the data through a plurality of switches including analysis to detect segment error, column error, and payload error.

25 Claims, 15 Drawing Sheets

STAIR STEP INTERCONNECT

CONGESTION-FREE SWITCH SYSTEM

INPUT AND OUTPUT CONTROLLERS

HIGHLY PARALLEL SWITCHING SYSTEMS UTILIZING ERROR CORRECTION

RELATED PATENT AND PATENT APPLICATIONS

The disclosed system and operating method are related to subject matter disclosed in the following patents and patent applications that are incorporated by reference herein in their entirety:

1. U.S. Pat. No. 5,996,020 entitled, "A Multiple Level Minimum Logic Network", naming Coke S. Reed as inventor;
2. U.S. Pat. No. 6,289,021 entitled, "A Scaleable Low Latency Switch for Usage in an Interconnect Structure", naming John Hesse as inventor;
3. U.S. Pat. No. 6,754,207 entitled, "Multiple Path Wormhole Interconnect", naming John Hesse as inventor;
4. U.S. Pat. No. 6,687,253 entitled, "Scalable Wommhole-Routing Concentrator", naming John Hesse and Coke Reed as inventors;
5. U.S. patent application Ser. No. 09/693,603 entitled, "Scaleable Interconnect Structure for Parallel Computing and Parallel Memory Access", naming John Hesse and Coke Reed as inventors;
6. U.S. patent application Ser. No. 09/693,358 entitled, "Scalable Interconnect Structure Utilizing Quality-Of-Service Handling", naming Coke Reed and John Hesse as inventors;
7. U.S. patent application Ser. No. 09/692,073 entitled, "Scalable Method and Apparatus for Increasing Throughput in Multiple Level Minimum Logic Networks Using a Plurality of Control Lines", naming Coke Reed and John Hesse as inventors;
8. U.S. patent application Ser. No. 09/919,462 entitled, "Means and Apparatus for a Scaleable Congestion Free Switching System with Intelligent Control", naming John Hesse and Coke Reed as inventors;
9. U.S. patent application Ser. No. 10/123,382 entitled, "A Controlled Shared Memory Smart Switch System", naming Coke S. Reed and David Murphy as inventors;
10. U.S. patent application Ser. No. 10/289,902 entitled, "Means and Apparatus for a Scaleable Congestion Free Switching System with Intelligent Control II", naming Coke Reed and David Murphy as inventors;
11. U.S. patent application Ser. No. 10/798,526 entitled, "Means and Apparatus for a Scalable Network for Use in Computing and Data Storage Management", naming Coke Reed and David Murphy as inventors;
12. U.S. patent application Ser. No. 10/866,461 entitled, "Means and Apparatus for Scalable Distributed Parallel Access Memory Systems with Internet Routing Applications", naming Coke Reed and David Murphy as inventors;
13. U.S. patent application Ser. No. 10/887,762 entitled, "Means and Apparatus for a Self-Regulating Interconnect Structure", naming Coke Reed as inventor.

BACKGROUND

Interconnect network technology is a fundamental component of computational and communications products ranging from supercomputers to grid computing switches to a growing number of routers. However, characteristics of existing interconnect technology result in significant limits in scalability of systems that rely on the technology.

For example, even with advances in supercomputers of the past decade, supercomputer interconnect network latency continues to limit the capability to cost-effectively meet demands of data-transfer-intensive computational problems arising in the fields of basic physics, climate and environmental modeling, pattern matching in DNA sequencing, and the like.

For example, in a Cray T3E supercomputer, processors are interconnected in a three-dimensional bi-directional torus. Due to latency of the architecture, for a class of computational kernels involving intensive data transfers, on the average, 95% to 98% of the processors are idle while waiting for data. Moreover, in the architecture about half the boards in the computer are network boards. Consequentially, a floating point operation performed on the machine can be up to 100 times as costly as a floating point operation on a personal computer.

As both computing power of microprocessors and the cost of parallel computing have increased, the concept of networking high-end workstations to provide an alternative parallel processing platform has evolved. Fundamental to a cost-effective solution to cluster computing is a scalable interconnect network with high bandwidth and low latency. To date, the solutions have depended on special-purpose hardware such as Myrinet and QsNet.

Small switching systems using Myrinet and QsNet have reasonably high bandwidth and moderately low latency, but scalability in terms of cost and latency suffer from the same problems found in supercomputer networks because both are based on small crossbar fabrics connected in multiple-node configurations, such as Clos network, fat tree, or torus. The large interconnect made of crossbars is fundamentally limited.

A similar scalability limit has been reached in today's Internet Protocol (IP) routers in which a maximum of 32 ports is the rule as line speeds have increased to OC192.

Many years of research and development have been spent in a search for a "scalable" interconnect architecture that will meet the ever-increasing demands of next-generation applications across many industries. However, even with significant evolutionary advancements in the capacity of architectures over the years, existing architectures cannot meet the increasing demands in a cost-effective manner.

SUMMARY

An interconnect structure comprises a logic capable of error detection and/or error correction. A logic formats a data stream into a plurality of fixed-size segments. The individual segments include a header containing at least a set presence bit and a target address, a payload containing at least segment data and a copy of the target address, and a parity bit designating parity of the payload, the logic arranging the segment plurality into a multiple-dimensional matrix. A logic analyzes segment data in a plurality of dimensions following passage of the data through a plurality of switches including analysis to detect segment error, column error, and payload error.

BRIEF DESCRIPTION OF THE DRAWINGS

Embodiments of the illustrative systems and associated technique relating to both structure and method of operation, may best be understood by referring to the following description and accompanying drawings.

DETAILED DESCRIPTION

The disclosed system relates to structures and operating methods for using multiple interconnect structures to transfer data in systems including but not limited to: 1) routers, including Internet Protocol (IP) routers; 2) Ethernet switches; 3) ATM switches; 4) storage area network systems (SANS); 5) cluster computing systems; and 6) supercomputers. The present disclosure describes structures and methods for scheduling messages to pass through parallel switches, implementing multicasting, implementing error correction in various portions of the systems, and using extra or redundant system elements to replace elements that become defective.

The interconnect structures described in the related patents and patent applications are exceptional for usage in interconnecting a large number devices when low latency and high bandwidth are important. The self-routing characteristics and a capability to deliver multiple packets simultaneously to a selected output port of the referenced interconnect structures and networks can also be favorably exploited.

Figure 4A:
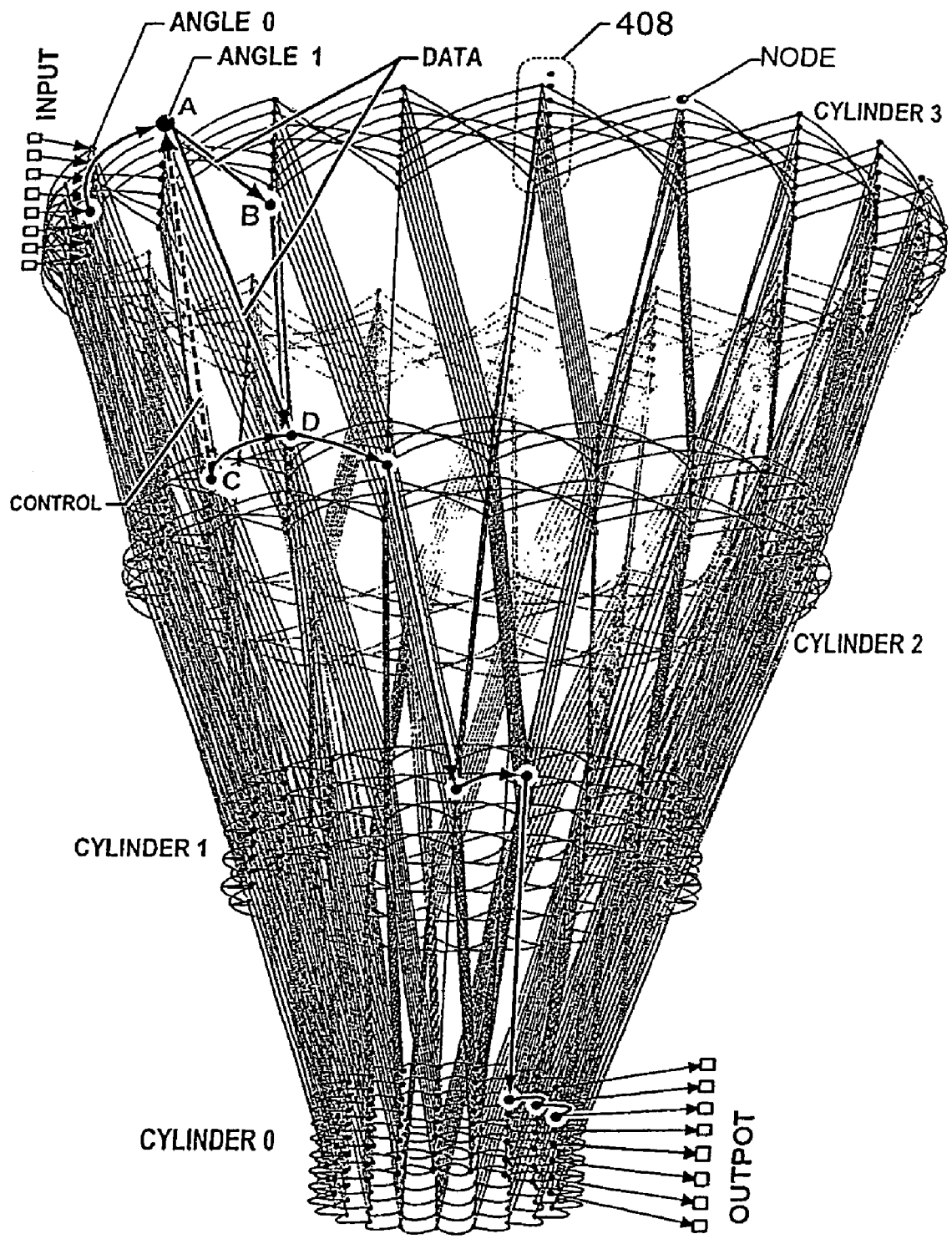
FIG. 4A is a schematic pictorial diagram illustrating a four-cylinder, eight-row network that exemplifies multiple-level, minimum-logic (MLML) networks.
Figure 4B:
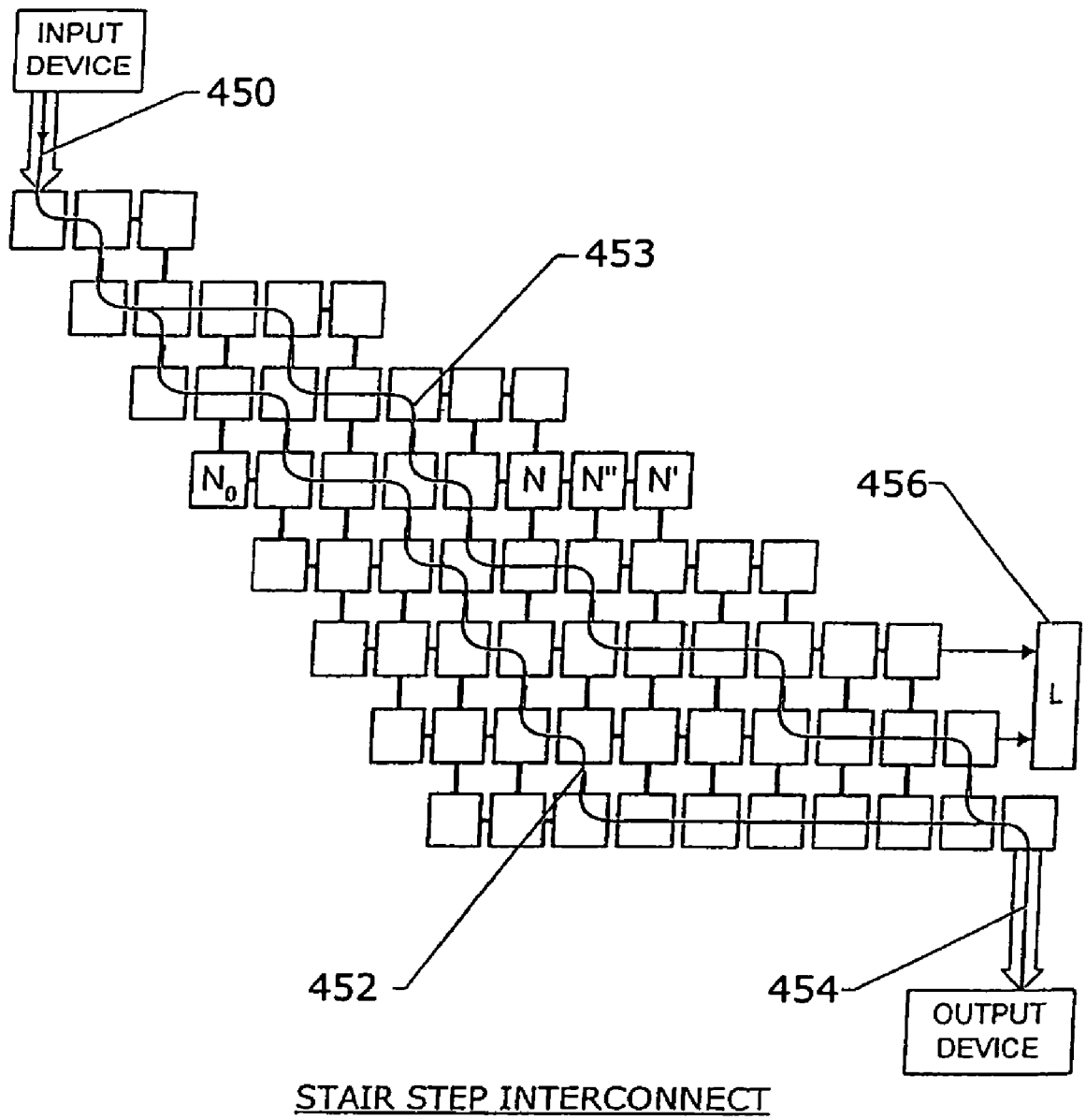
FIG. 4B is a schematic diagram showing a stair-step interconnect structure.
Figure 5A:
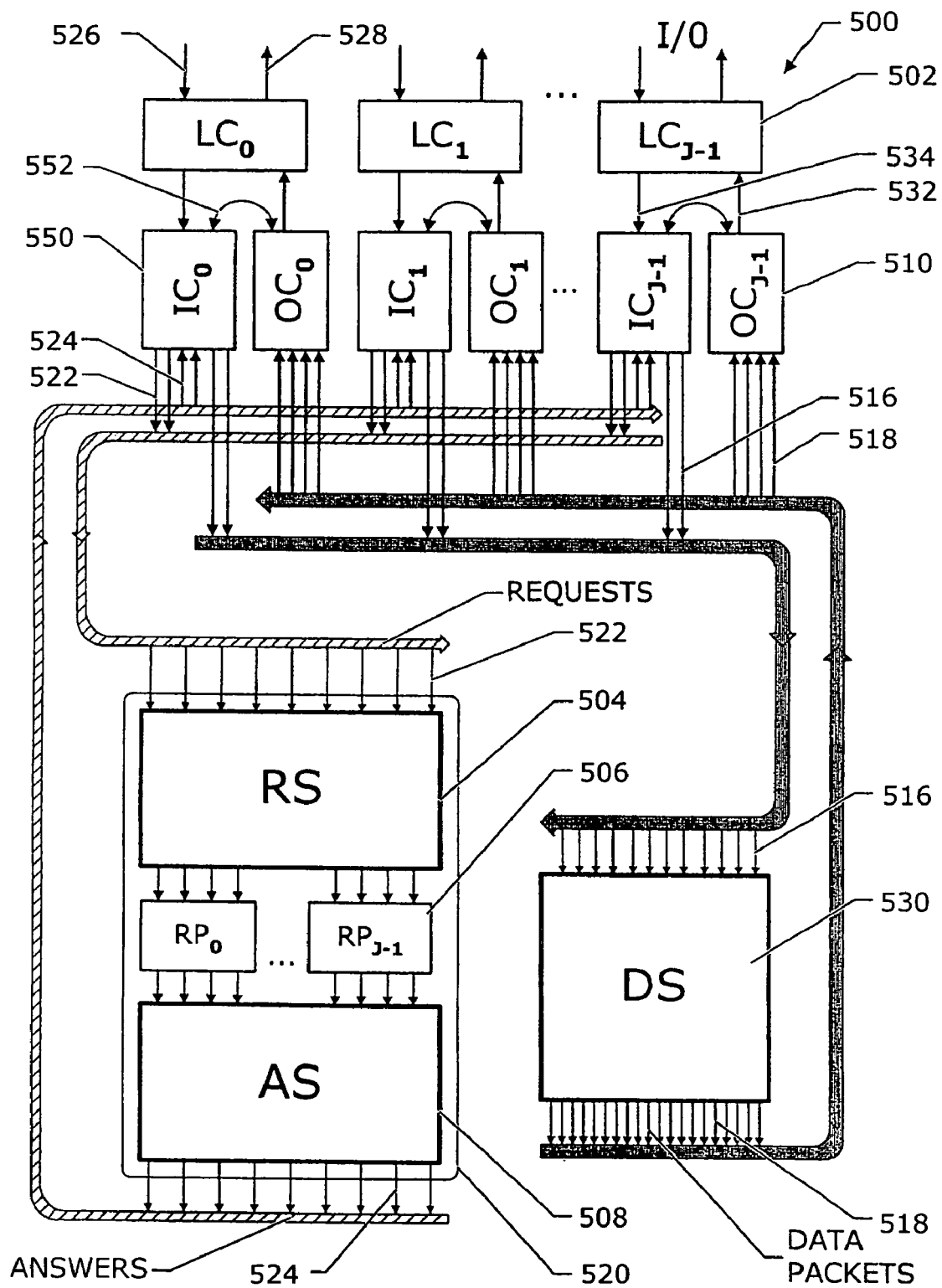
FIGS. 5A through 5F are schematic block diagrams showing various embodiments and aspects of a congestion-free switching system with intelligent control.
Figure 5B:
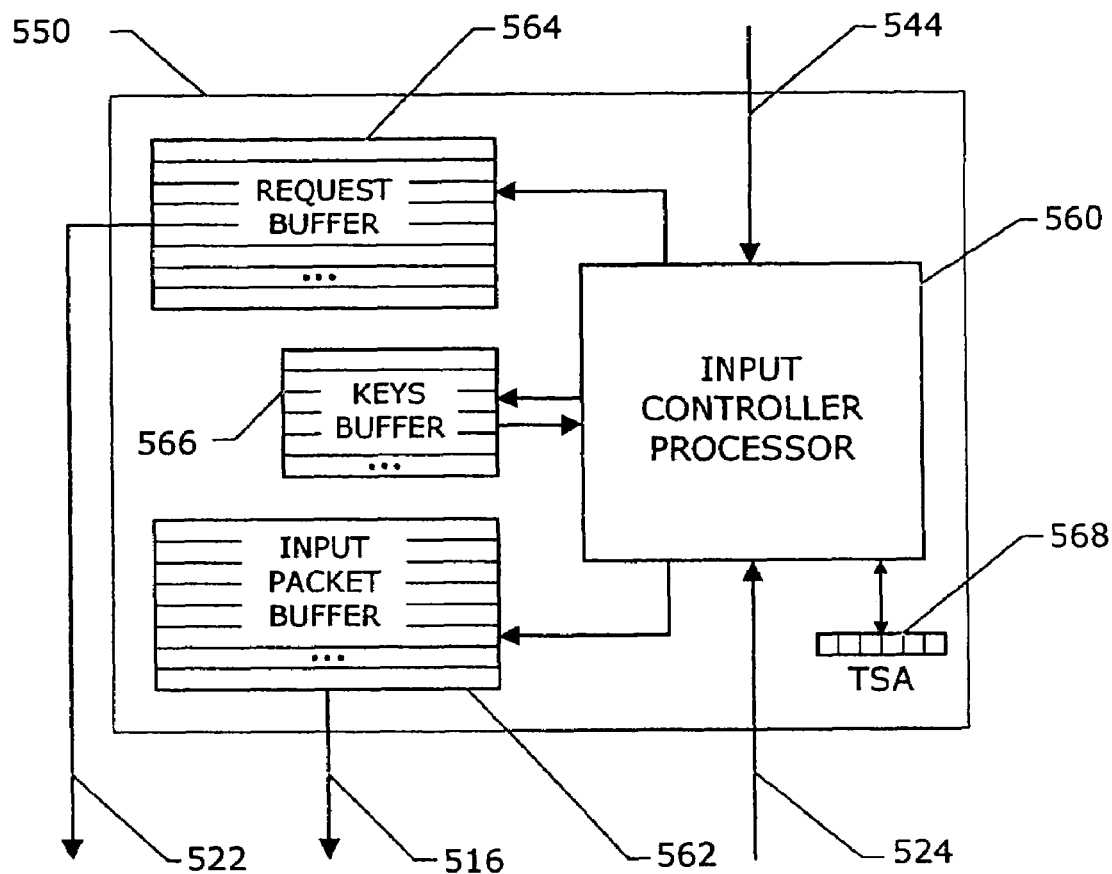
Figure 5C:
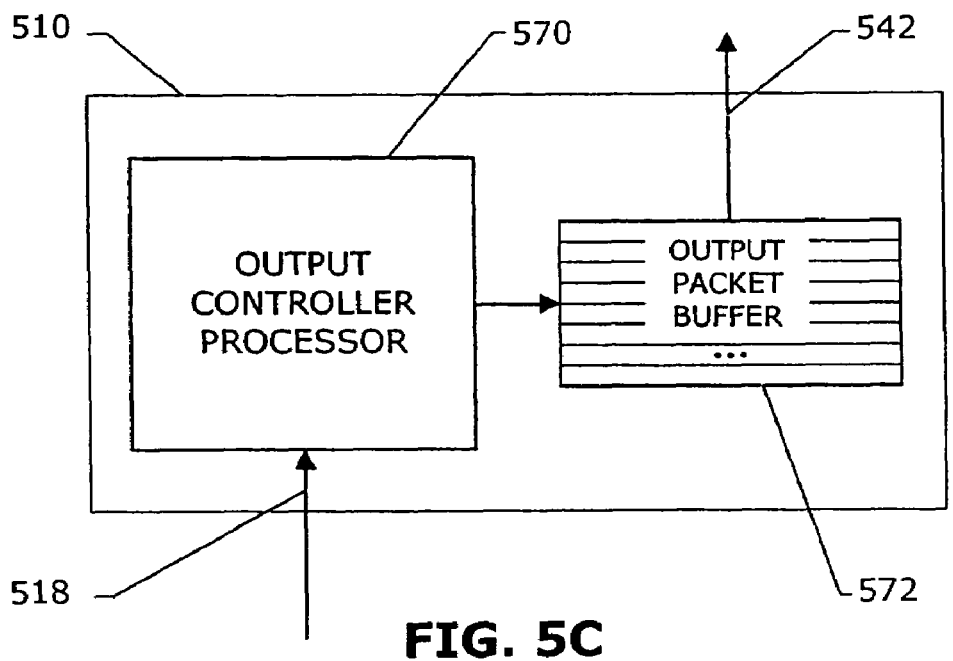
Figure 5D:
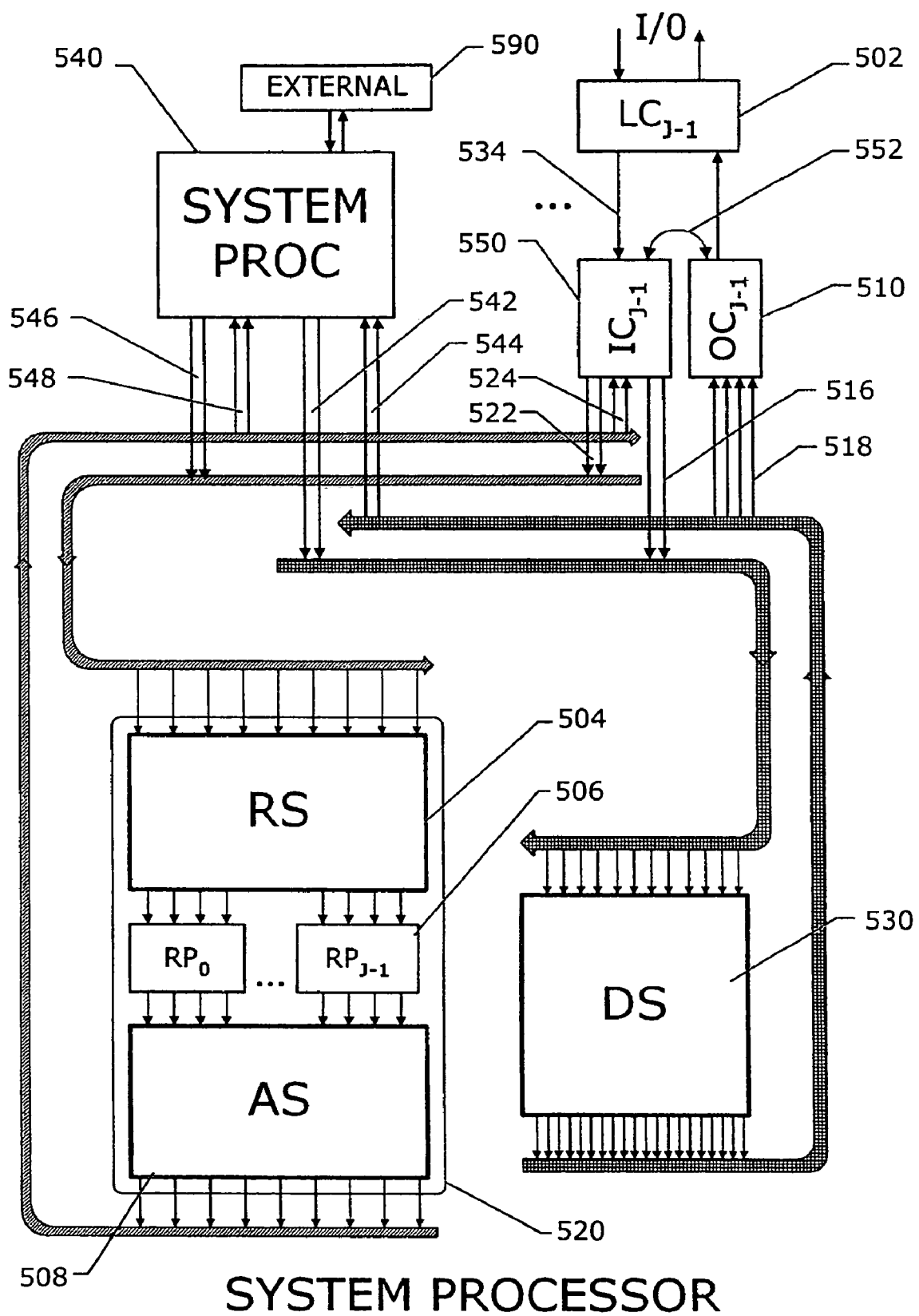
Figure 5E:
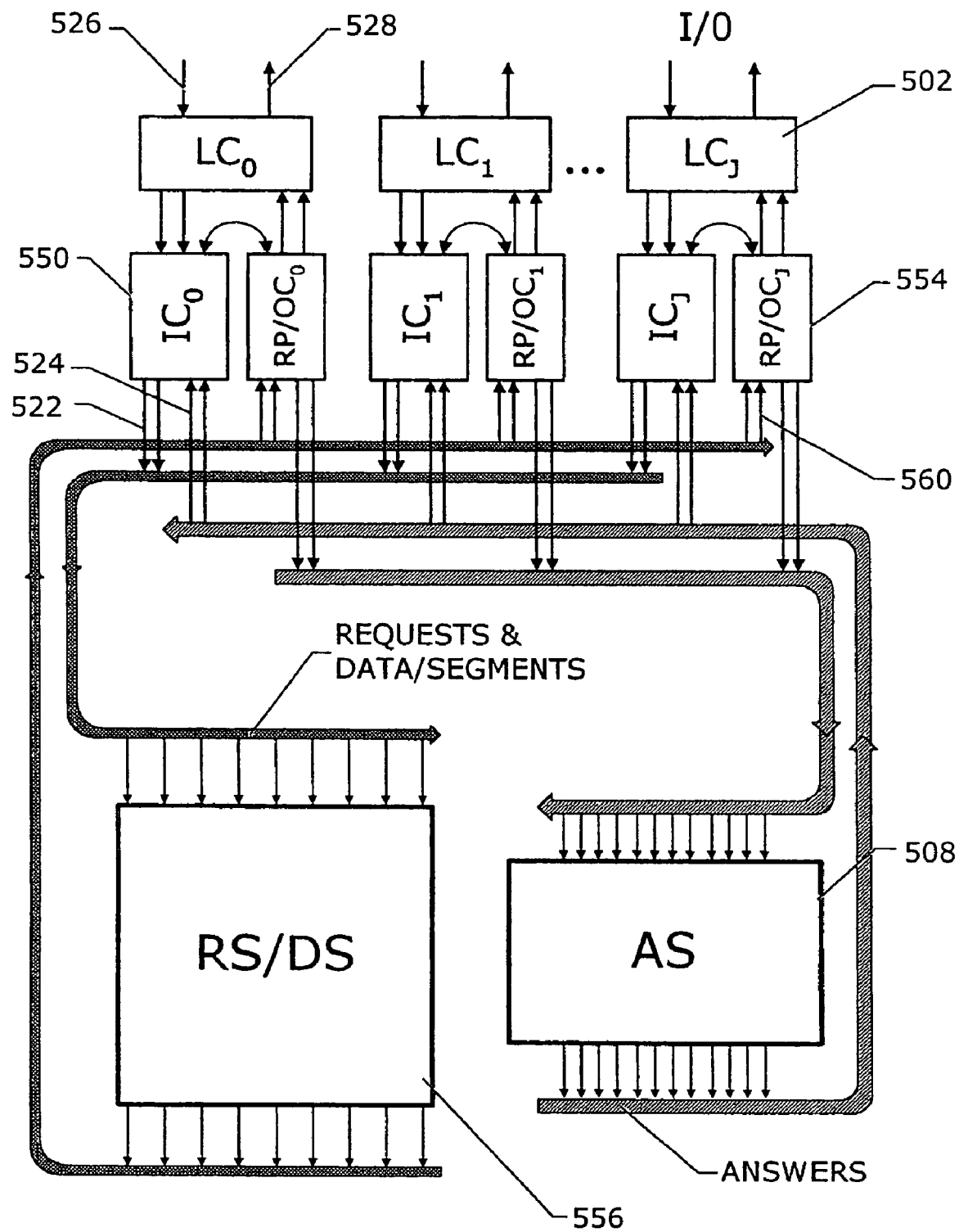
Figure 5F:
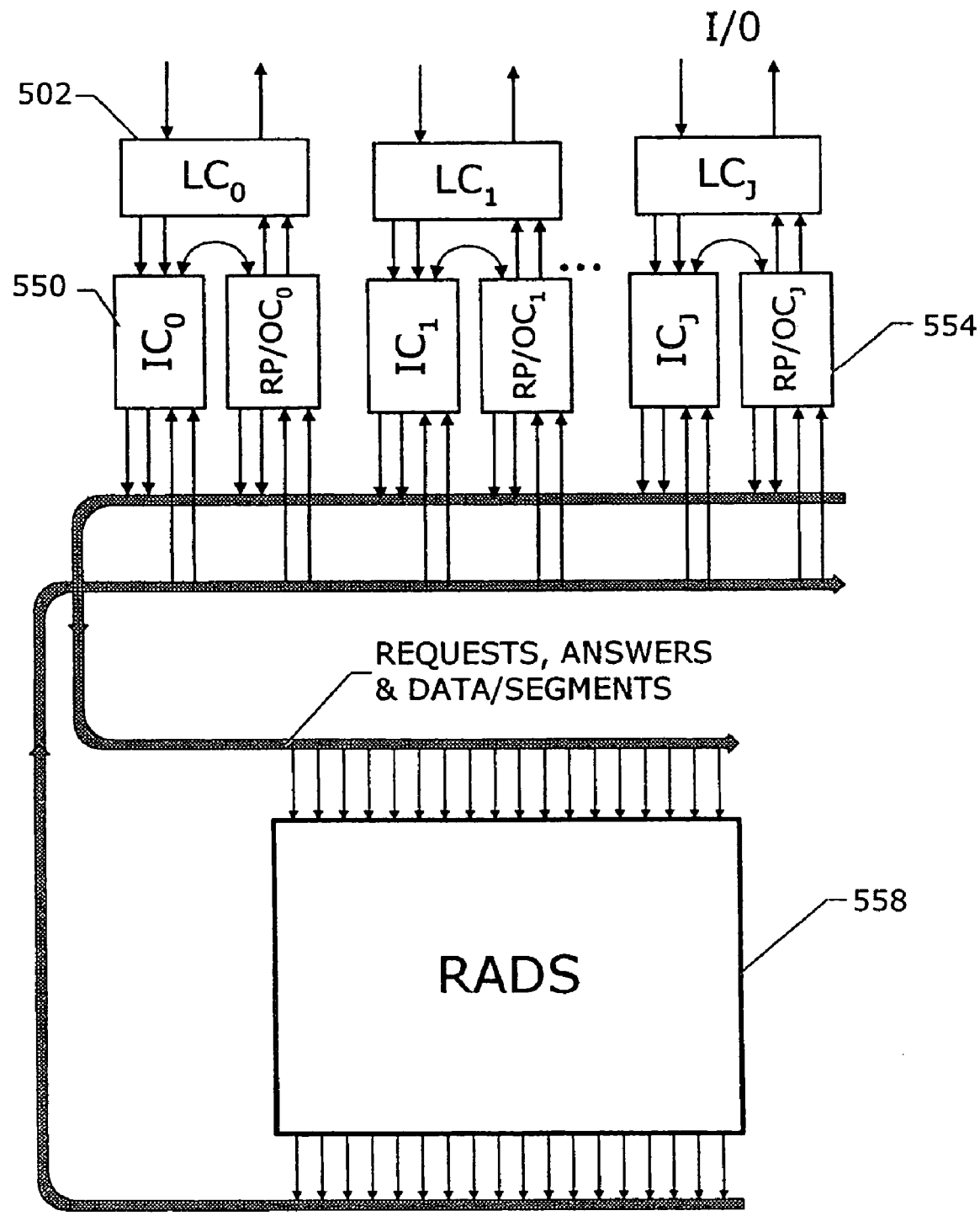

FIGS. 4A and 4B show an example of topology, logic, and use of a revolutionary interconnect structure that is termed a "Multiple Level Minimum Logic" (MLML) network and has also been referred to as the "Data Vortex". Two types of multiple-level, minimum-logic (MLML) interconnect structures can be used in systems such as those disclosed in FIGS. 5A through 5F and FIGS. 6A and 6B. One type of interconnect structure disclosed in FIG. 4A can be called a "Data Vortex switch" and has a structure with multiple levels arranged in circular shift registers in the form of rings. In a second type of interconnect structure described in FIG. 4B and termed herein a "stair-step interconnect", a portion of each ring of the Data Vortex switch structure is omitted so that each level includes a collection of non-circular shift registers.

In FIGS. 5A through 5F, stair-step switches of the types described in FIG. 4B can be used to carry data. The stair-step switches are also used to carry data in the scheduled data switches described in FIGS. 6A and 6B. Multiple copies of the stair-step switches can be used to decrease latency of the last bit of each packet segment and also increase bandwidth of the interconnect structure. In embodiments using multiple switches, FIGS. 5A through 5F disclose a technique of decomposing packet segments into sub-segments and then simultaneously sending the sub-segments through a set or stack of stair-step switches, preventing any two sub-segments from passing through the same switch in the set. Each stair-step switch in the set is followed by an additional switch composed of a plurality of crossbar switches. The same structure, including a stack of stair-step switches followed by plurality of crossbar switches with one crossbar for each shift register of the exit level of the stair-step switch, can be used to carry the data in the scheduled data switches in FIGS. 6A and 6B.

The structures and operating methods disclosed herein have an error correction capability for correcting errors in payloads of data packet segments and for correcting errors resulting from misrouted data packet sub-segments. In some embodiments, the illustrative system performs error correction for data packet segments that are routed through stacks of networks, including network stacks with individual networks in the stack having the stair-step configuration depicted in FIG. 4B. In other embodiments, the illustrative system performs error correction in network stacks with individual stack member networks having a Multiple-Level, Minimum-Logic (MLML) or Data Vortex configuration as disclosed in FIG. 4A.

Various embodiments of the disclosed system correct errors in data packet segments that are routed through stacks of networks with individual networks in the stack having the stair-step design illustrated in FIG. 4B and individual switches in the stack are followed by a plurality of crossbar switches. A crossbar switch is associated with individual bottom-level shift registers of the stair-step interconnect structures of the stack.

Some of the illustrative structures and operating methods correct errors occurring in systems that decompose data packet segments into sub-segments and a sub-segment fails to exit through an output port of a stair-step interconnect structure, for example the sub-segment is discarded by the switch. Various embodiments can correct errors for packets entering request and answer switches disclosed in FIGS. 5A through 5F, and also for packets entering uncontrolled switches described in computing and storage area networks taught in FIGS. 6A and 6B. Accordingly, the disclosed structures and associated operating techniques may be used in a wide class of systems that include data switching capability. Such systems may include switches that are neither MLML switches nor stair-step switches. The technology could, for example, be applied to stacks of crossbar switches or stacks of multiple hop networks, including toroidal networks, Clos networks, and fat-tree networks.

Figure 6A:
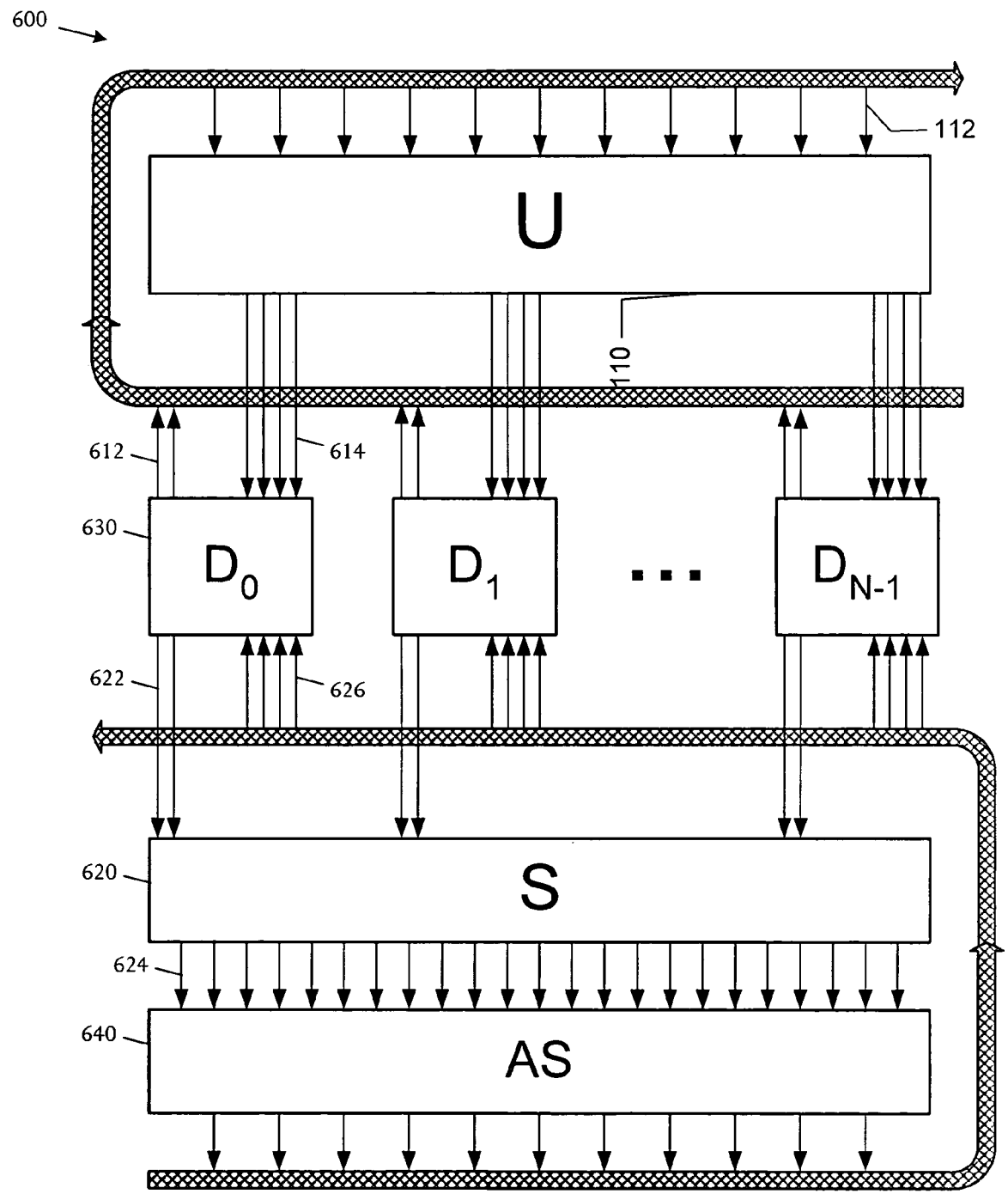
FIG. 6A is a schematic block diagram that illustrates multiple computing and data storage devices connected to both a scheduled network and an unscheduled network.
Figure 6B:
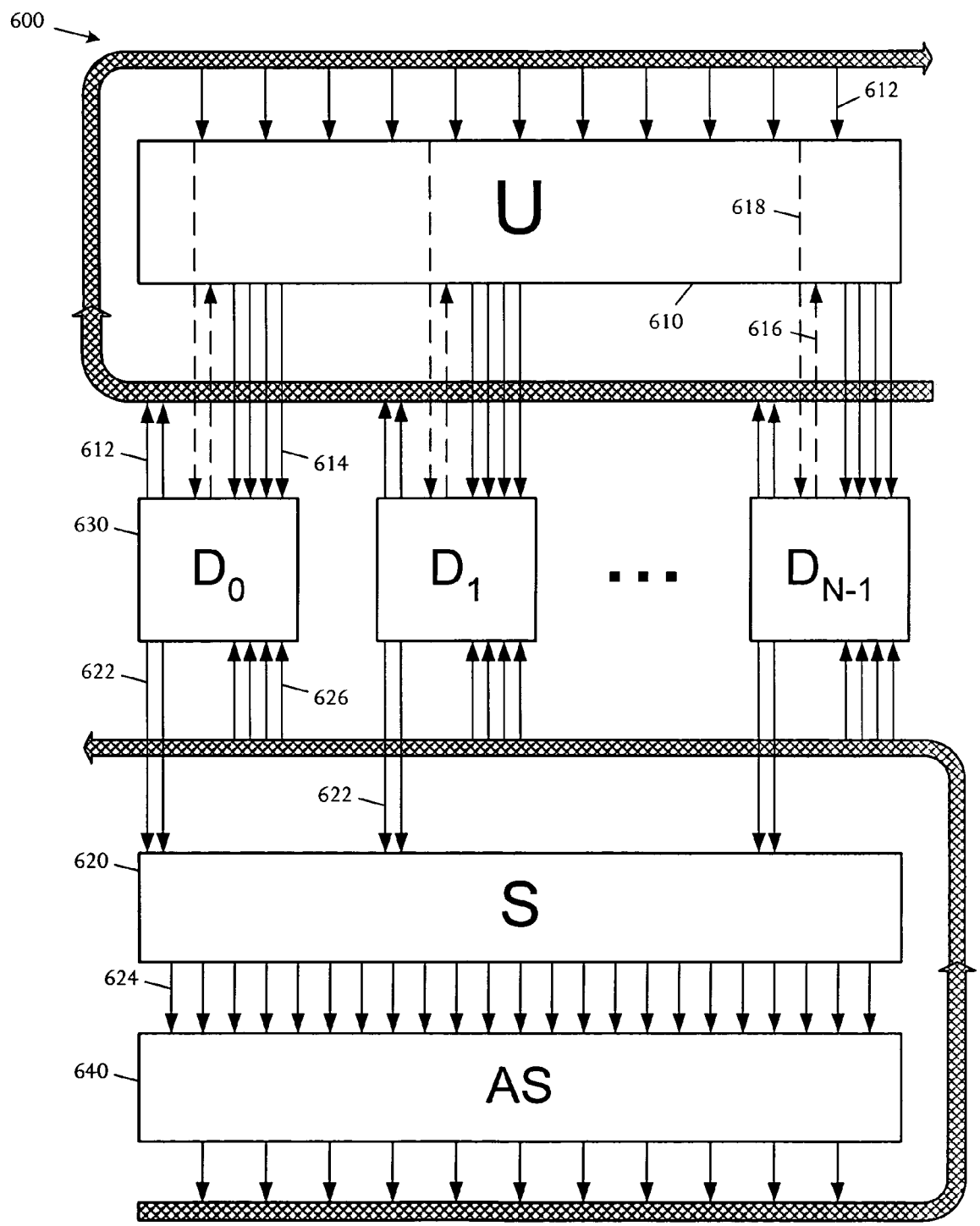
FIG. 6B is a schematic block diagram showing the system depicted in FIG. 6A with the addition of control lines associated with the unscheduled switch.

FIGS. 5A through 5F describe a system that includes a plurality of stair-step interconnect structures in a data switch with input of data controlled by request processors. FIGS. 6A and 6B disclose a system with a plurality of stair-step interconnect structures in scheduled networks. For such systems with K•N switches arranged in a stack of stair-step interconnect structures, with input devices capable of inserting K•N data streams into the switch stack. Many embodiments are possible for such a system. One example embodiment is a system that operates on full data packet segments, without decomposing the packets into sub-segments, and has an input device that can simultaneously insert K-N segments into a stack of stair-step interconnect structures. Each segment is inserted into a separate switch in the stack. In another example embodiment, data packet segments are decomposed into N sub-segments, each with the same header, and an input device is capable of simultaneously inserting two packet segments into the structure. Each of the resulting K•N sub-segments is inserted into a separate switch in the stack. In a third example embodiment, data packet segments are decomposed into K•N sub-segments, each with the same header, and an input device is capable of simultaneously inserting all K•N sub-segments of a particular packet segment. Each sub-segment inserts into a separate switch in the stack of stair-step switches. In systems that use H header bits to route a sub-segment through a stair-step interconnect structure, H header bits are included per packet segment in the first embodiment, N•H header bits per packet segment are included in the second embodiment, and K•N•H header bits per packet segment are used in the third embodiment. Accordingly, the first embodiment maximizes the ratio of payload to header.

FIGS. 5A through 5F disclose a system with input controllers and request processors. The input controller sends requests to a request processor to schedule data through the data switch. In FIGS. 6A and 6B, a request to schedule data to a target output port is sent to a request processor that controls data sent to that output port. Requests for scheduling data through switches in the references are analogous or similar. In a system embodiment that decomposes data packet segments into K•N sub-segments, for example the third embodiment hereinabove, the request specifies a set of available times the K•N packet sub-segments can be inserted into the switch. In a system embodiment that decomposes data packet segments into N sub-segments, for example the second embodiment hereinabove, the request specifies two sets of available times, one for each of the two sets of N stair-step switches. In a system embodiment that operates on full data packet segments, for example the first embodiment hereinabove, the request specifies K•N sets of available times, one set for each data packet segment. Therefore, the logic to schedule the data through the stack of stair-step switches is simplest for the third embodiment and most complicated for the first embodiment. The more complicated logic of the first embodiment also has request packets that contain more data, so that the amount of traffic though the request and answer switches disclosed in FIGS. 5A through 5F, and through the unscheduled switches disclosed in FIGS. 6A and 6B is greatest in the first embodiment and least in the third embodiment.

Figure 1A:
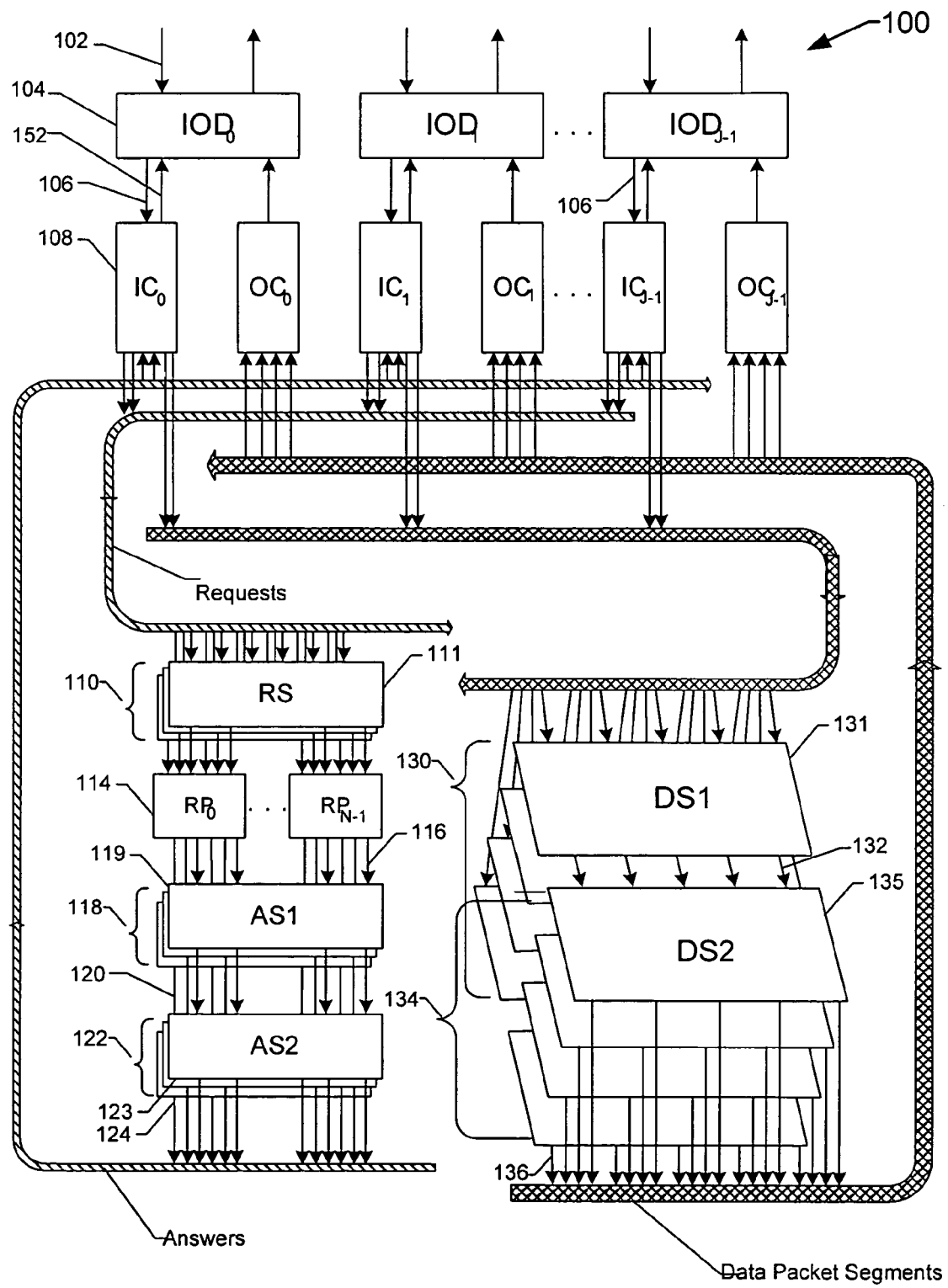
FIG. 1A is a schematic block diagram that illustrates a communication system including both a plurality of MLML Data Vortex networks and also a plurality of MLML stair-step interconnects.

Referring to FIG. 1A, a schematic block diagram illustrates an embodiment of a system 100 configured as a controlled communications interconnect structure using two types of Multiple-Level, Minimum-Logic (MLML) networks. Data packets enter the system 100 through input lines 102 into an input-output device 104 and then travel through line 106 to an input controller 108. In response to the arriving message packet, the input controller 108 may submit a request to send the data packet through a stack of data switches 130 and an optional stack of auxiliary data switches 134 to a target output port. The input controller 108 can make the request by sending a request packet through a request switch 111 to a request processor 114 that governs data flow into an output controller 112 that is the target of the packet. In one embodiment, the request switch 111 may be a member of a stack of request switches 110.

Data Flow Control in a Communication Network System

The request packet is relatively short, therefore the entire request packet can be efficiently sent through a single switch in the switch stack. Multiple input controllers 108 may simultaneously send request packets to the same request processor 114, therefore usage of an MLML switch of the Data Vortex type for the request processor can substantially improve performance. More packets can be inserted into the request switch 114 at a selected packet insertion time than can simultaneously exit the switch. Therefore, request packets may circulate around the Data Vortex before exiting.

The request processor 114 returns an answer packet to the requesting input controller 108. For example, the request processor 114 can send the answer packet through an answer switch 119, possibly as part of a stack of answer switches 118 and also possibly through an optional secondary answer switch 123. The answer switch 123 may also be part of a stack of answer switches 122. Routing of answer packets through an answer switch at the same level L of the answer switch stack that the request packet travels through in the request switch may improve performance. The routing can be accomplished by designating the integer L in the request packet data.

The number of unanswered requests that a request processor can have active at any given time can be limited. The limit can be enforced by an input controller 108 maintaining a counter $C_L$ for the individual switches 111 in the switch stack 110. The counter $C_L$ can be internal to the input controller. The counters $C_L$ can be initially set to zero, incremented with each request packet sent into a request switch on level L, and decremented with each answer packet returned through an answer switch on level L. The counter $C_L$ can be managed to prohibit exceeding a predetermined threshold $T_L$ so that the bandwidth of lines 116, 120, and 124 are not exceeded. Management of requests enables the level L answer switches to be in a stair-step interconnect configuration.

In one embodiment, the input controller specifies a bin designated to receive a given answer packet. Delivery to the proper bin is handled by the auxiliary switches 123 in auxiliary switch stack 122. An input controller can be constrained to send a request only if a bin is available that is not waiting for an answer, an effective alternative to using counters to control flow. A copy of the target bin can be included in the payload of the answer packet. The answer packet may also contain error correction bits, with the input controller having a capability to detect and correct errors. If the physical target input controller and input controller bin do not agree with the copy of the target input controller and bin in the error corrected answer packet, then the input controller may determine whether remaking of the request is warranted. If the data in the answer packet is determined to have uncorrectable errors, then the input controller may determine whether remaking the request is warranted. If a request processor schedules a packet through the data switch but the associated input controller does not send the packet because the answer packet is misrouted or cannot be corrected, then a gap in the scheduled time slots may result for the data switch that is not used, a condition that does not cause misrouting of another packet.

Some embodiments may enforce a limit TLIM on the amount of time that an input controller waits for an answer packet to arrive in response to sending a request packet. After the designated time limit expires, the input controller decreases the appropriate counter by one and frees the appropriate bin. A time stamp TS may be added to the request packet indicating when the request packet is sent. The request processor does not send answer packets that would arrive at the input controller after time TS+TLIM. Should the calculated arrival time exceed the limit, the request processor discards the request packet. In some embodiments, the time spent in sending the answer packet through the answer switches AS1 119 and AS2 123 is deterministic and fixed, enabling the request processor to calculate the time that an answer packet will arrive at an input controller and enabling the request processor to properly enforce the time limit. In a first embodiment, TLIM is the same for all request packets. In a second embodiment, TLIM depends upon the priority of the message.

In some embodiments, the input controller schedules an entire packet to pass through the data switches. The packet is segmented so that the data switches always send segments of the same length. Each segment of a packet may be further decomposed into sub-segments, with all sub-segments sent simultaneously through a plurality of data switches. For error correction purposes, one or more error correction packets of length equal to the length of a sub-segment may also be sent through the data switch. Accordingly, a segment and associated error correction data packets are simultaneously sent through the data switches 131 in the data switch stack 130 and then through the optional auxiliary data switches 135 in the data switch stack 134. In one embodiment, the number NS of data switches in the stack is equal to the number of sub-segments plus the number of associated error correction packets. In alternative embodiments, the number of data switches in the stack can be greater than NS so that a plurality of segments can simultaneously pass through the data switch stack 134.

In one example, the number of sub-segments and check-bit packets for a packet segment is equal to N and the number of data switches in the stack 130 is equal to W•N. Three example embodiments are disclosed for managing data scheduling in the illustrative condition. In a first embodiment, the W•N data switches are divided into W mutually exclusive sets, each containing N switches. The input controller sends a request packet that designates W available time sets for injecting a packet into the data switch, one set of times for each of the W switch sets. Specifying multiple time sets ensures sufficient output buffer space and enables the request processor to also guarantee a path through data lines 132 and 136. Resources are sufficient to handle the data so long as adequate bandwidth through the totality of lines 132 and 136 and sufficient bandwidth through the data lines in each of the W sets of lines are available.

In a second embodiment, an input controller selects one of the W sets of switches and then requests to send a packet through the selected set. In case the request is denied, the input controller requests to send through another one of the sets. An algorithm for picking a set for the request can be based on a random process, a round robin scheme, or some other scheme.

A third embodiment has W groups of input controllers with a sub-stack of N switches assigned to each group. Other embodiments may also be used to manage data flow through the switches.

Switch Output Interface Configurations

Figure 2:
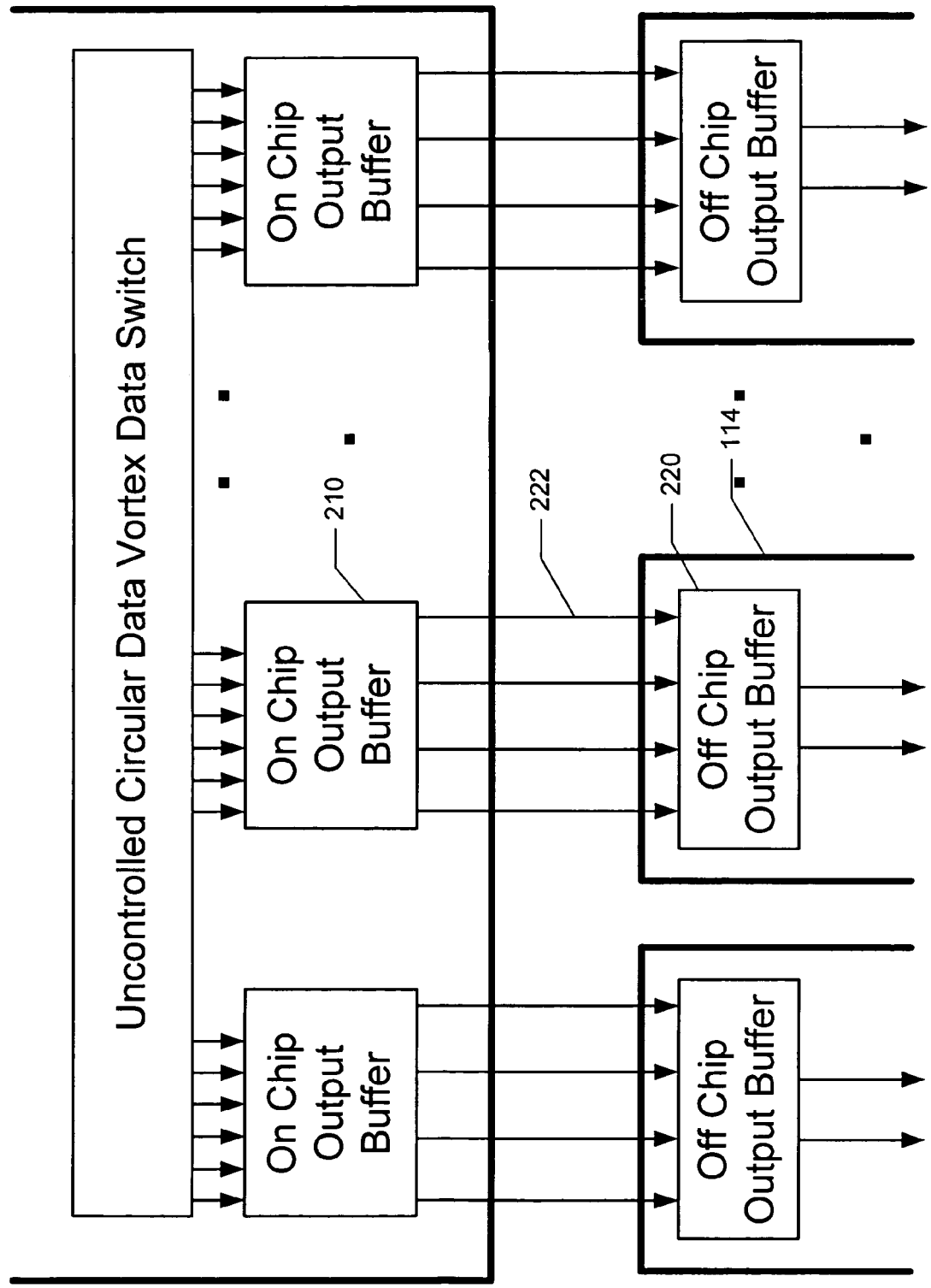
FIG. 2 is a schematic block diagram that depicts an output section of an MLML Data Vortex switch.

The request packet is relatively short so that the entire request packet may be conveniently sent through a single MLML Data Vortex switch 111 of the stack of switches 110. Referring to FIG. 2, a schematic block diagram illustrates two output buffer levels from a Data Vortex switch. The output buffers represent two levels of "leaky buckets". One version incorporates an on-chip output buffer 210 and a larger off-chip output buffer 220. The buffers are used to handle bursts in traffic volume. In a first embodiment, the buffers operate on a first-in first-out (FIFO) basis. In a second embodiment, one or both of the buffers employ a strategic algorithm that, in some circumstances, enable a higher priority message A to exit the buffer ahead of a lower priority message B which enters the buffer before A.

Figure 3:
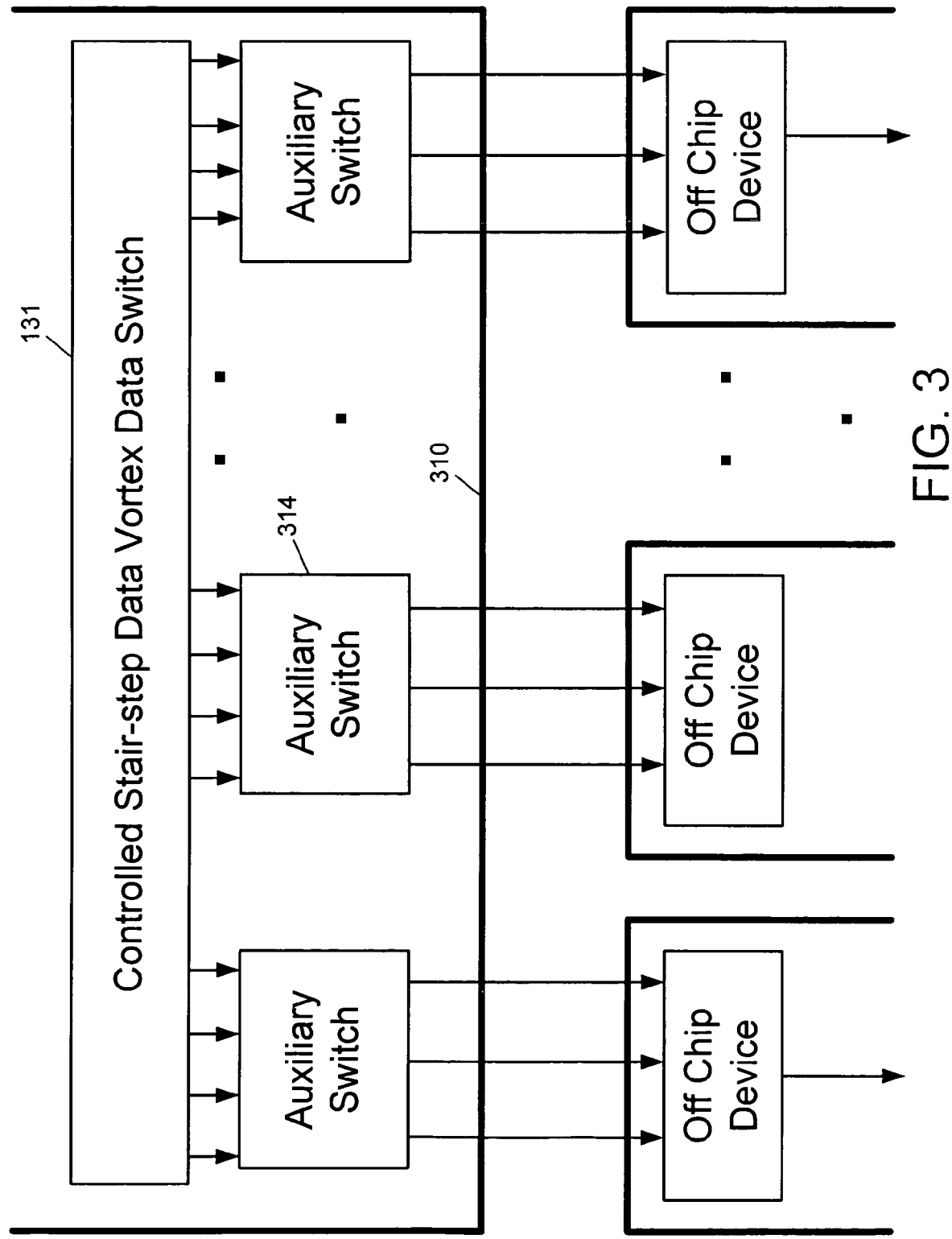
FIG. 3 is a schematic block diagram that illustrates an output portion of an MLML stair-step switch containing auxiliary crossbar switches.

A data segment is generally long in comparison to a request packet. Accordingly, decomposing the data segment into sub-segments may improve performance. For example, each segment can be decomposed into N sub-segments. At a segment-sending time determined by the request processor, N sub-segments containing both data and associated error-correction bits, plus the additional error correction packet are sent simultaneously through the data switch stack 130 and then through the auxiliary data switch stack 134. FIG. 3 illustrates a first chip 310 containing one MLML stair-step switch 131 and multiple cross-bar switches 314 which, in combination, make up an optional second switch 135. The illustrative configuration may also be used in the answer switches shown in FIG. 1A in which the stair-step switch is the switch AS1 119 and the second switch is a switch AS2 123. Buffers are superfluous in the answer switches. Because data flow through the switches is controlled, the switches are never overloaded and correctly-routed data is assured in an immediate path from the chip. Accordingly, buffers can be eliminated. In a typical embodiment, buffers are not desired because the request processors exploit the deterministic nature of the time for an answer packet to pass through the answer switches and issue requests accordingly to avoid intermediate buffering.

The configuration shown in FIG. 3 may also be employed in the data switches shown in FIG. 1A in arrangements that include a stair-step switch as the switch DS1 131 and the second switch is a switch DS2 135. Buffers are also superfluous in the data switches because data flow through the switches is controlled. The data switches are never overloaded and correctly-routed data are assured an immediate path off of the chip. In embodiments using FIFOs whose length depends on the exit column of an exit row, elimination of buffers is desirable to facilitate simultaneous arrival of all sub-segments at the off chip device, where the segments can be corrected for errors and reassembled. In the configuration illustrated in FIG. 1A and FIG. 3, all sub-segments of a particular segment are guaranteed to exit the switch stack 134 and associated FIFOs at the same time. Elimination of buffers facilitates avoidance of misrouting of a second sub-segment that may otherwise occur following the misrouting of a first sub-segment. Moreover, misrouting of a sub-segment cannot influence the time that another sub-segment exits the switch stack 134.

In the system illustrated in FIG. 1A, the request processors 114 determine later scheduling of packets based on information concerning other packets presently scheduled as well as packets that have been scheduled in the past. Packets in output buffers have arrived at various times, and the decision to discard a packet P in an output buffer is based in part on information concerning packets arriving at system 100 after the arrival of P.

Figure 1B:
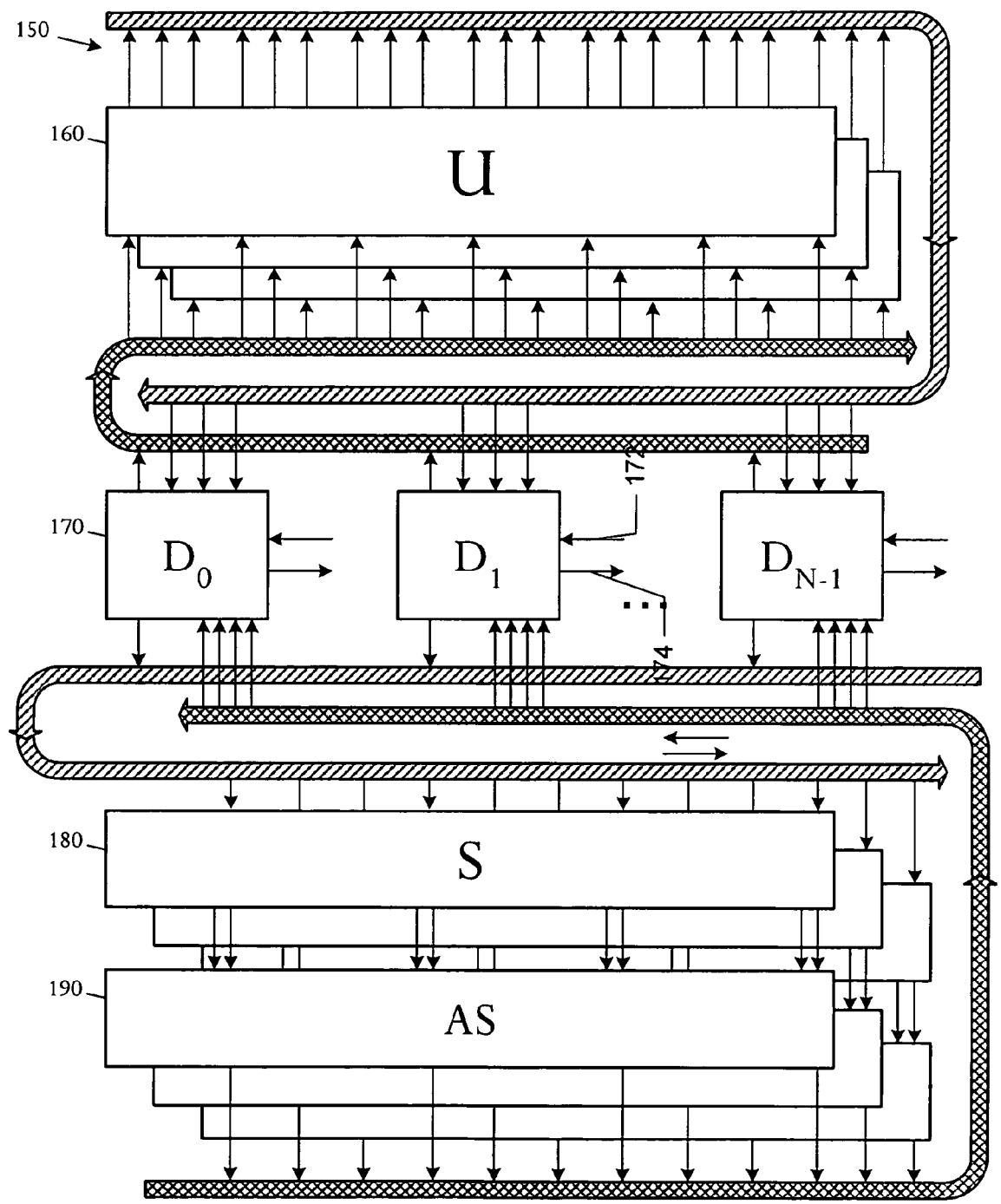
FIG. 1B is a schematic block diagram showing a system for cluster computing and storage area networks in a configuration with both a plurality of MLML Data Vortex networks and also a plurality of MLML stair-step interconnects.

Referring to FIG. 1B, a schematic block diagram depicts a system 150 that is useful in several applications, including cluster computing and mainframe computing. Unlike the system 100 illustrated in FIG. 1A, system 150 does not discard packets.

System 150 contains a plurality of devices 170 that may be of the same type or may differ in structure and function. The function of a device 170 may be computation, data storage and retrieval, or combined computation and data storage and retrieval. Devices 170 receive data from outside of system 150 through lines 172 and send data out of the system via lines 174. Devices 150 intercommunicate via interconnection lines and switches U 160, S 180 and AS 190. In some embodiments, the switch U can be a MLML Data Vortex. A device 170 can insert data into switch U without requesting permission. Since multiple devices may send data through switch U to the same target device T, the volume of data into target device T may exceed the bandwidth into device T through lines 162. Accordingly, buffers 210 can be arranged to receive output of the Data Vortex switch and to incorporate input buffers 220 into the computational and data storage devices.

Packets passing through switches S 180 in the stack of switches are scheduled or controlled to prevent overload, for example using techniques described in FIGS. 6A and 6B, therefore using switches S in the form of MLML switches of the stair-step type is convenient. Switches AS 180 can be constructed using a plurality of crossbar switches. Data can be passed through the switches using sub-segmentation. The interface between switches S and auxiliary switches AS is illustrated in FIG. 3.

For a set of segments or sub-segments entering a switch stack in a scheduled stair-step interconnect structure or entering a switch stack in a scheduled or controlled stair-step structure followed by a collection of crossbar switches, then the first bits of the segments in the set will exit the switch at the same time. If a sub-segment of one of the segments has a bit error in the header, then the sub-segment will not exit the switch at the target output port. Instead, the sub-segment will either exit through the erroneous output port designated by the header or will fail to exit through any output port and be discarded at the end of the bottom row of the stair-step switch. The misrouted sub-segment can cause misrouting of other sub-segments in the same switch. Note that the misrouted sub-segment cannot cause future misrouting of messages through the stair-step switch. Moreover, if the packet segments are not buffered on the switch in the stack, the misrouted sub-segment cannot cause future misrouting of any other sub-segments. The misrouted sub-segment cannot change exit times of any later-inserted sub-segments.

In contrast to a system that implements the scheduled stair-step structure, a segment that is misrouted in an unscheduled Data Vortex switch can cause a change in exit times of future segments that are inserted into the switch. Accordingly, packet segments are most efficiently sent through a single Data Vortex switch or through a stack of unscheduled Data Vortex switches without decomposition into sub-segments.

Figure 7A:
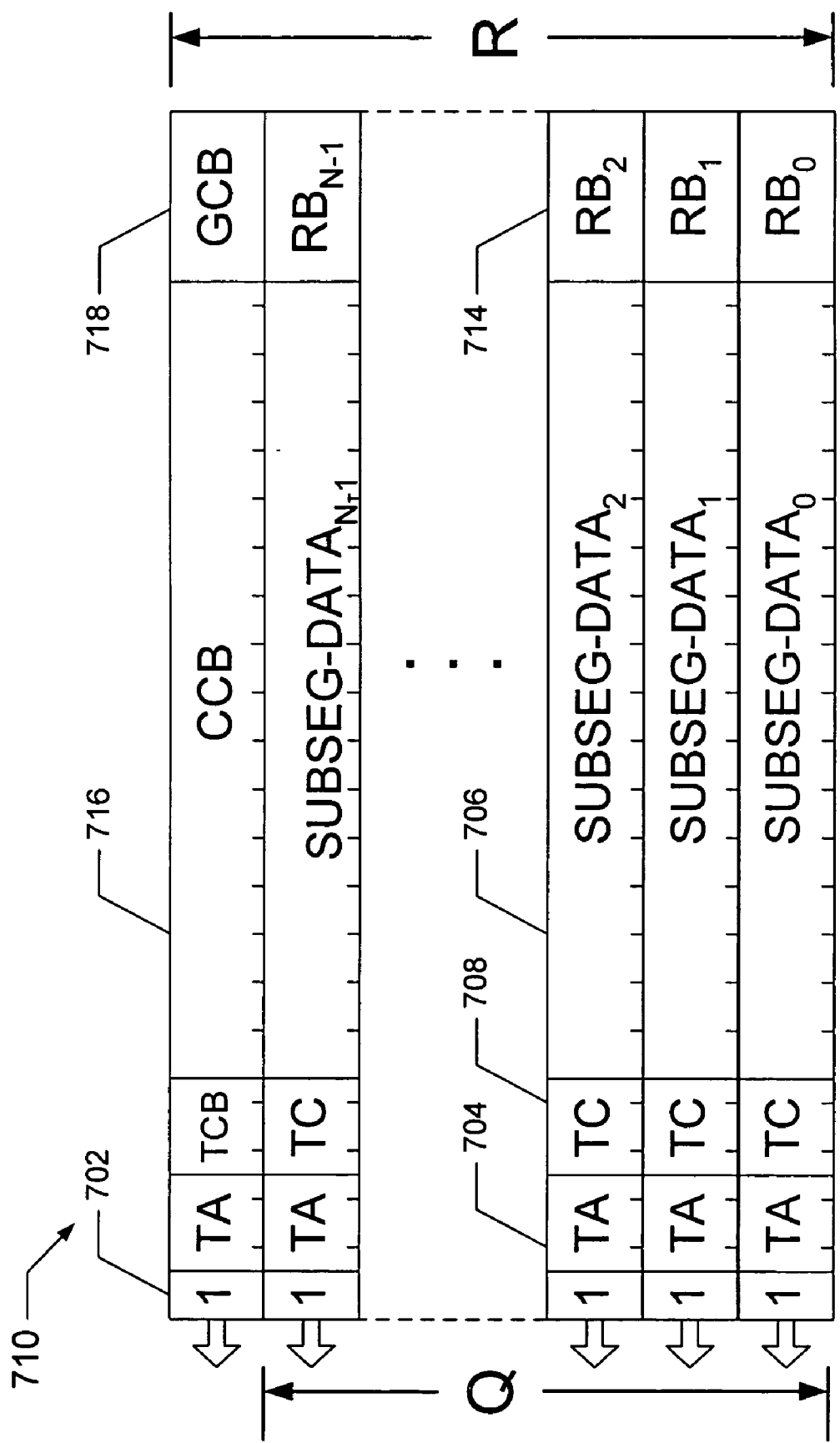
FIG. 7A is a schematic block diagram showing the data-carrying sub-segments arranged to form a matrix Q and then to form a matrix R with the addition of a non-data-carrying sub-segment.
Figure 7B:
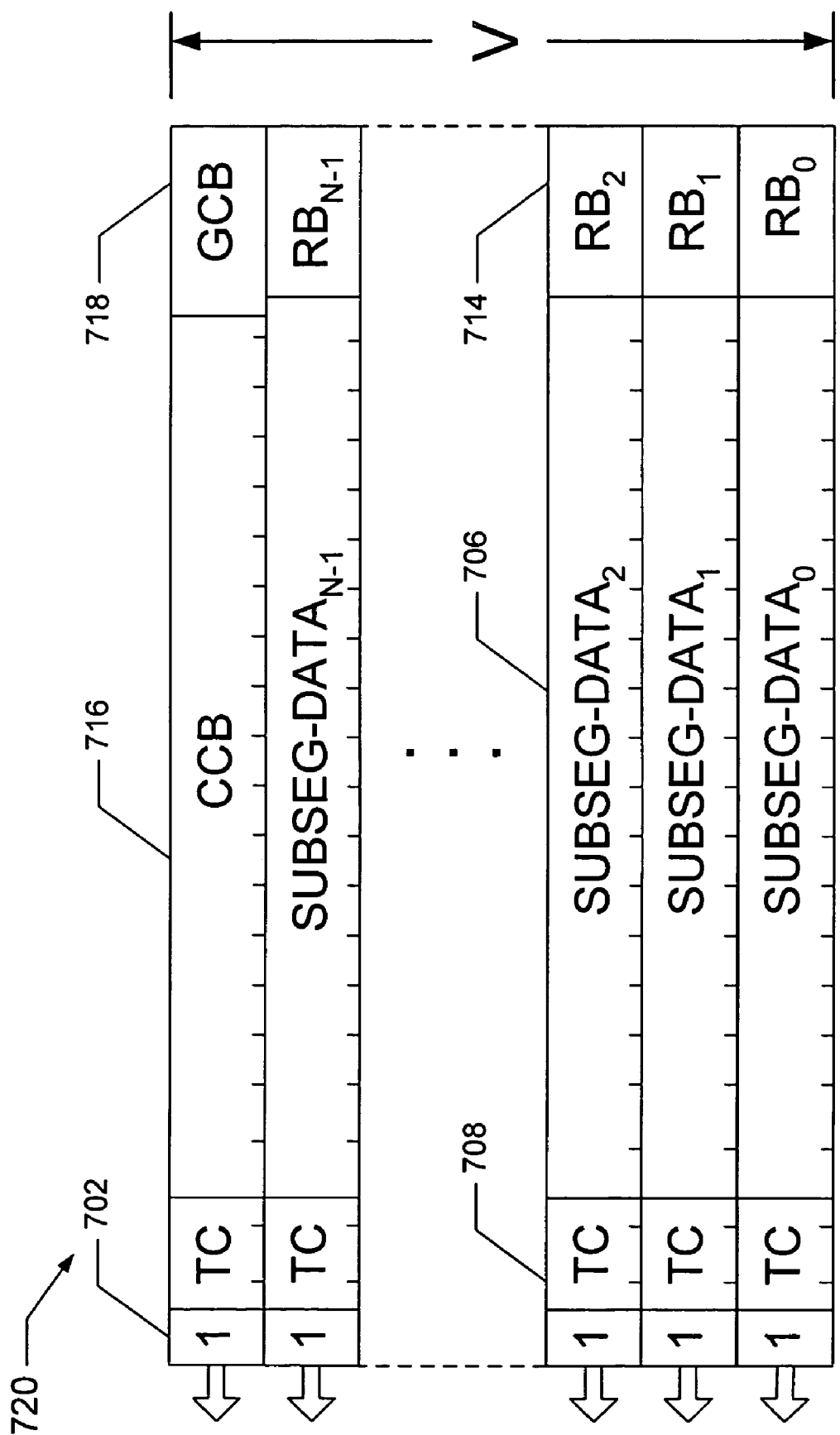
FIG. 7B is a schematic block diagram showing a matrix V containing the sub-segment data after it has passed through the switch.

The system and operating methods disclosed herein enable efficient correction of bit errors in either the header or the payload of segments. An illustrative method ensures single-bit error correction and two-bit error detection. Variations of the example are described in the discussion of the figures. In an example, D designates the number of data bits of a data carrying sub-segment payload and T designates the number of bits in a target address of the sub-segment. The target address includes bits used for routing a sub-segment through the stair-step switch plus bits used for routing the sub-segment through a crossbar switch, if present, following the stair-step switch. In the example, additional bits can be used for error correction and are added to each segment. The resulting lengthened segment is decomposed into N+1 sub-segments. Referring to FIG. 7A and FIG. 7B, N of the sub-segments carry data bits and also bits used in error correction. One of the sub-segments carries only error correction bits. Prior to insertion into the switch, each of the sub-segments has length M, where M=1+T+T+D+1. The data-carrying sub-segments include several fields. A first field is a header with length T+1 including a presence or existence bit 702 that, in some embodiments, is always set to one to indicate the presence of a sub-segment. The first field also includes a subfield TA 704 that encodes a target address. A second field is a payload with length D+T, including subfield TC 708 containing a copy of the sub-segment target address and subfield SUBSEG-DATA 706 containing subsegment data. A third field is a one-bit check or parity bit 714 designating parity for the existence bit and the D+T payload bits. The parity bit can be defined as a modulus 2 sum of the existence bit and the D+T payload bits. The N data carrying sub-segments (sub-segments 0, 1, . . . , N−1) are arranged into an N×M matrix Q with N rows and M columns. Entry Q(i, j) of matrix Q designates the $i^{th}$ bit of sub-segment j. The header of the non-data-carrying sub-segment N is the same as the other sub-segment headers. In case the $i^{th}$ bit of the sub-segment N is not a header bit, it is a parity bit defined to be [Q(i, 0)+Q(i, 1)+ . . . +Q(i, N−1)], where the addition is performed mod 2. The last bit of sub-segment N is the mod 2 sum of the N•(T+D+1) payload and existence bits of the N data-carrying sub-segments. Adding sub-segment N to Q forms an (N+1)×M matrix R, which represents the segment data passed through the switching system.

As each sub-segment passes through a switch, the leading target address bits are discarded and the resulting sub-segment has length T+D+2. After the switch, the N data-carrying sub-segments are reduced in length and include a single-bit header with only the presence or existence bit, for example set to one. The T target address bits of the header are removed during passage through the switch. A second field of the sub-segment is a payload with length D+T and includes the sub-segment data bits and a copy of the target address of the sub-segment. A third field is a one-bit check or parity bit for the D+T+1 bits including the payload bits and the existence bit. The non-data-carrying sub-segment includes a single existence bit, always set to one, followed by T+D+1 parity bits. The N data-carrying sub-segments plus the non-data-carrying sub-segment form an (N+1)×(M−T) matrix V, illustrated in FIG. 7B. After the N+1 sub-segments pass through N+1 switches, a process to detect and correct any possible single-bit error and to detect any two-bit error is performed on the data. A single-bit error in the target address used to send a sub-segment through one of the switches may be detected as multiple bit errors in the transmitted sub-segment data since an error in the target address will result in a misrouted sub-segment. However, such single-bit errors can be efficiently detected and corrected by replacing all of the miss-sent data bits with the correct bits.

In an illustrative embodiment, a process for error detection and correction has multiple actions. First, multiple types summations can be performed for error detection. A first type of summation detects row errors in matrix V. For each of the N individual data-carrying sub-segment payloads, all bits are added modulus 2. In a specific example, the T+D payload bits, the presence bit, and the check bit of each sub-segment K are added, an addition of T+D+2 bits for each sub-segment. A result of one designates detection of a sub-segment error in sub-segment K, i.e., a row error in matrix V. A result of zero indicates that no sub-segment row error is detected in sub-segment K. A second type of summation detects column errors in matrix V. Bits are summed up each column in matrix V. For example, for (T+1)<i≦(D+2T+2), the bits in column i of matrix Q are added modulus 2 to form the $i^{th}$ bit of the $N^{th}$ row of matrix R. A result of one designates detection of a column error in the $i^{th}$ column of matrix V. A result of zero designates no detected column error in the $i^{th}$ column of matrix V. A third type of summation detects global errors in matrix V. Modulus 2 summation of the N•(T+D+1) non-parity bits in matrix V of sub-segment 0 through sub-segment (N−1) plus the last bit of sub-segment N is calculated. A result of one indicates a payload error in matrix V, also termed a global error in matrix V. A zero designates no detection of a global error.

Second, the N copies of the target address in the data carrying sub-segments of matrix V are checked for a possible bit error in one of them. A single-bit error in a target address copy is indicated by a four-criterion condition. A first criterion is an error indication by a data check bit for a single sub-segment payload, specifically by a row check bit of matrix V. A second criterion is an error indication by a single data check bit in sub-segment N, specifically by a column check bit of matrix V in the section of the sub-segments containing the copied target addresses. A third criterion is an error indication by the $M^{th}$ bit of sub-segment N, the global check bit, designating an error in a sub-segment payload. The fourth criterion is that correction of the single-bit error in the target address copy of the sub-segment indicated by use of both the row check bit error and the column check bit error causes the target address copy of that sub-segment to agree with the address of the receiving data port.

Third, each sub-segment copy of the target address is checked for agreement with the receiving data port. The presence bit distinguishes between the cases of no data arriving and data destined for input port zero. If the presence bit is zero for some row of V, then the sub-segment associated with the row has been misrouted. In case the T header bits for exactly one sub-segment do not match the port ID, then the sub-segment has been misrouted. In either case, data in a single misrouted sub-segment can be corrected by replacing the data with proper data by using the check bits from sub-segment N. Upon completion of the data replacement, if no other errors are present, the process using the row, column, and global check bits will indicate that no errors are present.

Fourth, each of the N sub-segment payloads is checked for a single-bit error. The presence of a single-bit error is indicated by three criteria. A first criterion is that summation of columns detects a single column bit error in matrix V. In a second criterion, summation of rows detects a single row bit error in matrix V. And in a third criterion, global summation detects a global error in matrix V. In case a single error is detected, the error is located in matrix V at the unique location specified by the row with an error and the column with an error. The single bit error can be corrected.

Fifth, in a condition that one and only one row, column or global error occurs, the condition is caused by a single-bit error in one of the check bits. The error is ignored.

Sixth, a condition may occur in which data contains two or more bits in error. The multiple-bit error is detected when examination of the check bits and copies of the sub-segment addresses result in error conditions different from those described in the first five actions, for example: detection of two row errors in matrix V, detection of two column errors in matrix V, and detection of a global error in matrix V. Two-bit errors are always detectable. If no error condition is indicated, then either the data is correct or the data contains more than two bits in error, an error condition that is not universally detectable.

The illustrative embodiment has only one error correction bit in sub-segments that carry data. Other systems may be configured with sub-segments that contain additional error correction bits. Moreover, in the illustrative example, only one sub-segment has error correction bits that depend on data bits from multiple sub-segments. Other embodiments may have multiple such sub-segments enabling the correct reconstruction of data when multiple data sub-segments are misrouted. In various embodiments, a sub-segment may contain at least one error correction bit that is based on data and a payload $P_i$ of a sub-segment $S_i$ contains at lease one error correction bit that is based on data in a payload $P_K$ of a subsegment $S_K$ different from the sub-segment $S_i$.

FIG. 4A is a schematic pictorial diagram illustrating a four-cylinder, eight-row network that exemplifies the multiple-level, minimum-logic (MLML) networks taught in U.S. Pat. No. 5,996,020. Data in the form of a serial message enters the network at INPUT terminals to the network which are located at an outermost cylinder, shown as cylinder 3 at the top of FIG. 4A, and moves from node to node towards a target output port that is specified in a header of the message. Data always moves to a node at the next angle in one time period. A message moves toward an inner cylinder shown at a lower level in FIG. 4A whenever such a move takes the message closer to the target port.

The network has two kinds of transmission paths: one for data, and another for control information. In an illustrative embodiment, all nodes in the network may have the same design. In other embodiments, the nodes may have mutually different designs and characteristics. A node accepts data from a node on the same cylinder or from a cylinder outward from the node's cylinder, and sends data to node on the same cylinder or to a cylinder inward from the node's cylinder. Messages move in uniform rotation around the central axis in the sense that the first bit of a message at a given level uniformly moves around the cylinder. When a message bit moves from a cylinder to a more inward cylinder, the message bits synchronize exactly with messages at the inward cylinder. Data can enter the interconnect or network at one or more columns or angles, and can exit at one or more columns or angles, depending upon the application or embodiment.

A node sends control information to a more outward positioned cylinder and receives control information from a more inward positioned cylinder. Control information is transmitted to a node at the same angle or column. Control information is also transmitted from a node on the outermost cylinder to an input port to notify the input port when a node on the outermost cylinder that is capable of receiving a message from the input port is unable to accept the message. Similarly, an output port can send control information to a node on the innermost cylinder whenever the output port cannot accept data. In general, a node on any cylinder sends a control signal to inform a node or input port that the control signal sending node cannot receive a message. A node receives a control signal from a node on a more inward positioned cylinder or an output port. The control signal informs the recipient of the control signal whether the recipient may send a message to a third node on a cylinder more inward from the cylinder of the recipient node.

In the network shown in FIG. 4A, if a node A sends a message to a node B on the same cylinder, and node B receives data from a node J on an outer cylinder, then the node A independently sends control information to the node J. Node B, which receives messages from nodes A and J, does not participate in the exchange of control information between nodes A and J. Control-signal and data-routing topologies and message-routing schemes are discussed in detail hereinafter.

In U.S. Pat. No. 5,996,020 the terms "cylinder" and "angle" are used in reference to position. These terms are analogous to "level" and "column," respectively, used in U.S. Pat. No. 6,289,021, and in the present description. Data moves horizontally or diagonally from one cylinder to the next, and control information is sent outward to a node at the same angle.

FIG. 4B is a schematic diagram showing a stair-step interconnect structure. The stair-step interconnect structure has only one input column, no connections back from right to left, and no FIFOs. The structure may, however, have multiple output columns. A property of some embodiments of such interconnects is existence of an integer OUTLIM such that when no output row is sent more than OUTLIM messages during the same cycle, then each message establishes a wormhole connection path from an input port to an output port.

In another embodiment of the stair-step interconnect, multicasting of messages is supported by the use of multiple headers for a single payload. Multicasting occurs when a payload from a single input port is sent to multiple output ports during one time cycle. Each header specifies the target address for the payload, and the address can be any output port. The rule that no output port can receive a message from more than one input port during the same cycle is still observed. The first header is processed as described hereinbefore and the control logic sets an internal latch which directs the flow of the subsequent payload. Immediately following the first header, a second header follows the path of the first header until reaching a cell where the address bits determinative of the route for that level are different. Here the second header is routed in a different direction than the first. An additional latch in the cell represents and controls a bifurcated flow out of the cell. Stated differently, the second header follows the first header until the address indicates a different direction and the cell makes connections such that subsequent traffic exits the cell in both directions. Similarly, a third header follows the path established by the first two until the header bit determinative for the level indicates branching in a different direction. When a header moves left to right through a cell, the header always sends a busy signal upward indicating an inability to receive a message from above.

The rule is always followed for the first, second, and any other headers. Stated differently, when a cell sends a busy signal to upward then the control signal is maintained until all headers are processed, preventing a second header from attempting to use the path established by a first header. The number of headers permitted is a function of timing signals, which can be external to the chip. The multicasting embodiment of the stair-step interconnect can accommodate messages with one, two, three or more headers at different times under control of an external timing signal. Messages that are not multicast have only a single header followed by an empty header, for example all zeros, in the place of the second and third headers. Once all the headers in a cycle are processed the payload immediately follows the last header, as discussed hereinabove. In other embodiments, multicasting is accomplished by including a special multicast flag in the header of the message and sending the message to a target output that in turn sends copies of the message to a set of destinations associated with said target output.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, components, and dimensions can be varied to achieve the desired structure as well as modifications, which are within the scope of the claims. Variations and modifications of the embodiments disclosed herein may also be made while remaining within the scope of the following claims.

What is claimed is:

1. An interconnect structure comprising:
    a data switch comprising a plurality of input ports and at least one output port; and
    a logic that formats a data segment comprising a header H and a payload P into a collection C of sub-segments, the individual sub-segments $s_i$ for i from 0 to C−1 comprising a header $h_i$ including information about a target output port and a payload $p_i$ that is a function of the header H and the payload P, the payload $p_i$ further comprising at least one error correction bit that is based on data in payload $p_k$ of a sub-segment $s_k$ different from the sub-segment $s_i$.

2. The interconnect structure according to claim 1 wherein:
    the logic sends the collection C sub-segments $s_i$ through a selected plurality of the input ports to at least one target output port, and to reconstruct the payload P from the payloads $p_i$ received at the target output ports specified by the headers $h_i$; and
    the logic reconstructs the payload P in a sub-segment error condition.

3. The interconnect structure according to claim 1 wherein:
    the logic reconstructs the payload P in event of an error in a payload $p_i$ of a received sub-segment $s_i$.

4. The interconnect structure according to claim 1 wherein:
    the logic reconstructs the payload P in event of misrouting of a sub-segment $s_i$.

5. The interconnect structure according to claim 1 further comprising:
    a plurality of data switches; and
    the collection C includes sub-segments $s_1$ and $s_2$ whereby the logic sends the sub-segments $s_1$ and $s_2$ through different data switches in the data switch plurality.

6. The interconnect structure according to claim 1 wherein:
    the data switch is a Multiple Level Minimum Logic (MLML) network.

7. The interconnect structure according to claim 1 wherein:
    the logic reconstructs the payload P in event of misrouting of a sub-segment $s_1$ caused by an error in the header $h_1$ of the sub-segment $s_1$.

8. The interconnect structure according to claim 1 wherein:
    the logic reconstructs the payload P in event of misrouting of a sub-segment $s_1$ caused by an error in the header $h_2$ of the sub-segment $s_2$ different from the sub-segment $s_1$.

9. The interconnect structure according to claim 1 wherein:
    the logic reconstructs the payload P in event of misrouting of a sub-segment $s_1$ caused by hardware error.

10. The interconnect structure according to claim 1 wherein:
    the data segment is a data packet.

11. The interconnect structure according to claim 1 wherein:
    the data segment is a data packet that is decomposed into multiple sub-segments.

12. An interconnect structure comprising:
    a data switch comprising a plurality of input ports and at least one output port; and
    a logic that formats a data segment comprising a header H and a payload P into a collection C of sub-segments, the individual sub-segments $s_i$ for i from 0 to C-1 comprising a header $h_i$ including information about a target output port and a payload $p_i$ that is a function of the header H and the payload P, the logic is adapted to reconstruct the payload P in event of misrouting of a sub-segment $s_i$.

13. The interconnect structure according to claim 12 wherein:
the payload $p_i$, further comprises at least one error correction bit that is based on data in payload $p_k$ of a sub-segment $s_k$ different from the sub-segment $s_i$.

14. An interconnect structure comprising:
a data switch comprising input ports and output ports; and
a logic that formats a data segment comprising a header H and a payload P into a collection C of sub-segments with a sub-segment s in collection C having a header and a payload, the header including information about a target output port and the payload that is a function of header H and payload P; and
the logic sending the segments in collection C through a plurality of input ports of the interconnect structure to target output ports; and
a logic that reconstructs payload P from the data received at the target output ports of collection C; and
the logic reconstructing payload P in case of error in a payload of a received segment; and
the logic reconstructing payload P in case one of the segments of collection C is misrouted.

15. An interconnect structure comprising:
a logic for error detection and/or error correction further comprising:
a logic that formats a data stream into a plurality of fixed-size segments, the individual segments including a header containing at least a set presence bit and a target address, a payload containing at least segment data and a copy of the target address, and a parity bit designating parity of the payload, the logic arranging the segment plurality into a multiple-dimensional matrix; and
a logic that analyzes segment data in a plurality of dimensions following passage of the data through a plurality of switches including analysis to detect segment error, column error, and payload error.

16. The interconnect structure according to claim 15 further comprising:
a logic that decomposes data segments into a plurality of sub-segments; and
a logic that analyzes segment data following passage of the data through a plurality of switches including modular-2 summation over a sub-segment payload, presence bit, and check bit for detecting sub-segment error, modular-2 summation bit-by-bit for all bits of a plurality of sub-segments for detecting column error, and modular-2 summation over a plurality of sub-segment payload bits for detecting payload error.

17. The interconnect structure according to claim 15 further comprising:
a logic that decomposes data segments into a plurality of sub-segments; and
a logic that analyzes header bits over a plurality of sub-segments for detecting bit error in a condition of a data row check bit of a switch for a single sub-segment payload indicates an error, a single data column check bit of a switch for a sub-segment indicates an error in a sub-segment section that contains copied target addresses, a selected global check bit of a selected sub-segment indicates an error in a sub-segment payload, and correction of a single-bit error indicated by use of the row check bit and the column check bit causes a target address section of a sub-segment to match a receiving data port address.

18. The interconnect structure according to claim 15 further comprising:
a logic that decomposes data segments into a plurality of sub-segments;
a logic that analyzes sub-segment copies of the target address for agreement with a receiving data port; and
a logic that responds to a mis-match between target address and receiving data port by replacing a mis-routed sub-segment with proper data using check bits.

19. The interconnect structure according to claim 15 further comprising:
a logic that decomposes data segments into a plurality of sub-segments;
a logic that analyzes sub-segment payloads for single-bit error including summing over switch array columns to detect single-bit error, summing over switch array rows to detect single-bit error, and/or global summation to detect single-bit error; and
a logic that responds to condition of a single error from among the row, column, and global single-bit errors by ignoring the error as being caused by a single-bit error of a check bit.

20. An interconnect structure comprising:
a plurality of data switches arranged into a data switch stack;
at least one input controller that submits requests to send a data packet through the data switch stack to a targeted output controller, the at least one input controller that detects and/or corrects errors utilizing communicated error correction bits; and
at least one request processor that receives requests from the at least one input controller and governs data flow through the data switch stack to the output controller targeted by the data packet, the at least one request processor producing an answer packet for communication to the requesting input controller and formatting the answer packet with error correction bits for usage by the input controller for detecting and/or correcting errors.

21. The interconnect structure according to claim 20 further comprising:
at least one input controller that enforces a limit on number of unanswered requests that a request processor can have active at one time by maintaining a counter for each switch in the switch stack and regulates issuance of requests so that the counter does not exceed a pre-established threshold number of requests.

22. The interconnect structure according to claim 20 further comprising:
at least one input controller that compares physical target input controller and bin information to target input controller and bin information in an answer packet to determine an error condition, and responds by correcting the error or remaking a request for uncorrectable errors.

23. The interconnect structure according to claim 20 further comprising:
at least one input controller that enforces a time limit on duration for awaiting an answer packer in response to sending of a request packet;
at least one input controller that schedules a data packet for passage through the data switches, the data packet being segmented so that the data switches pass segments of a common length;
at least one input controller that decomposes data segments into multiple sub-segments and sends the multiple sub-segments simultaneously through a plurality of data switches; and at least one input controller that decomposes data segments into multiple sub-segments and sends the multiple sub-segments simultaneously through a plurality of data switches, and formats and passes at least one error correction packet of length equal to the sub-segment length through the data switch.

24. The interconnect structure according to claim 20 further comprising:

at least one request processor that determines when the answer packet will arrive at the requesting input controller and whether the answer packet will arrive within an enforced time limit, and discards the request packet associated with a tardy answer packet;

at least one request processor that manages data packet scheduling based on information relating to other data patents previously and currently scheduled;

at least one request switch that conveys requests from ones of the input controller to ones of the request processor;

at least one answer switch that relays an answer packet from the at least one request processor to the requesting input controller; and at least one auxiliary switch in a switch stack selectively coupled to ones of the at least one request processor, the auxiliary switches managing delivery of answer packets relayed from the request processors to selected bins of the requesting input controller.

25. The interconnect structure according to claim 20 further comprising:

a plurality of W•N data switches divided into W mutually exclusive sets, each containing N data switches, the input controller that selects one of the W sets of data switches and requests to send a packet through the selected data switch set.

* * * * *